United States Patent [19]

Sunagawa et al.

[11] Patent Number: 4,797,867
[45] Date of Patent: Jan. 10, 1989

[54] PICK-UP HEAD FOR OPTICAL INFORMATION STORAGE DISK

[75] Inventors: Hiroshi Sunagawa; Kozi Kamiyama, both of Kanagawa, Japan

[73] Assignee: Fuji Photo Film Co., Ltd., Japan

[21] Appl. No.: 919,015

[22] Filed: Oct. 15, 1986

[30] Foreign Application Priority Data

Oct. 16, 1985 [JP] Japan .................................. 60-230289

[51] Int. Cl.$^4$ ............................................. G11B 7/095
[52] U.S. Cl. ........................................ 369/45; 369/46; 369/112; 350/96.11
[58] Field of Search ....................... 369/32, 44, 45, 46, 369/112, 120, 121, 122; 250/201 DF; 350/96.11, 96.12, 96.13, 96.14

[56] References Cited

U.S. PATENT DOCUMENTS

| 4,193,091 | 3/1980 | Kleuters | 369/44 |
| 4,385,798 | 5/1983 | Yevick | 350/96.14 |
| 4,394,060 | 7/1983 | Verber et al. | 350/96.13 |
| 4,425,023 | 1/1984 | Matsumoto et al. | 350/96.14 |
| 4,545,046 | 10/1985 | Jansen et al. | 369/44 |
| 4,672,187 | 6/1987 | Fujita et al. | 369/45 |

FOREIGN PATENT DOCUMENTS

| 0174008 | 12/1986 | European Pat. Off. | 369/46 |
| 3534776 | 10/1986 | Fed. Rep. of Germany | 369/46 |
| 59-79441 | 8/1984 | Japan | 369/46 |

Primary Examiner—Donald McElheny, Jr.
Attorney, Agent, or Firm—Gerald J. Ferguson, Jr.

[57] ABSTRACT

A pick-up head for use with an optical information storage disk includes an optical waveguide, a light source, a waveguide lens, a focusing grating coupler, and a light detector. Wave light generated by the light source and propagated via the wave guide lens through the optical waveguide is deflected by a surface elastic wave generated by an inter-digital transducer. The inter-digital transducer is controlled by a tracking error signal to vary the frequency of the surface elastic wave to change the deflection angle of the wave light in order to eliminate any tracking error to which a light spot on the optical disk is subjected. Focusing control may be effected by a conventional focusing control mechanism or a bimorph driven by a focusing error signal.

4 Claims, 2 Drawing Sheets

PICK-UP HEAD FOR OPTICAL INFORMATION STORAGE DISK

BACKGROUND OF THE INVENTION

1. Field of the Invention

The present invention relates to a pick-up head for reading out signals recorded on an optical information storage disk, and more particularly to such a pick-up head employing an optical waveguide.

2. Description of the Prior Art

Optical information storage disks (hereinafter referred to as "optical disks") are widely used as mediums for recording image signals, audio signals, and the like thereon. The signals recorded as pits on the optical disk are read out by a pick-up head having an optical lens system. The pick-up head emits a light beam such as a laser beam that is directed to the information storage surface of the optical disk, and detects the level of light reflected from the optical disk to ascertain whether there is a pit or not at the location which is hit by the light beam.

One proposed pick-up head for use with optical disks employs an optical waveguide (see Electronic Communications Society Technical Report OQE 84-109, page 97). This pick-up head comprises an optical waveguide made of a material capable of propagating a surface elastic wave, a light source for emitting light into the optical waveguide, a waveguide lens for converting the wave light traveling through the optical waveguide into parallel-ray wave light, a focusing grating coupler formed on a surface of the optical waveguide for guiding the wave light out of the optical waveguide and focusing the wave light onto the surface of an optical disk, and a light detector for detecting the light reflected by the surface of the optical disk back into the optical waveguide through the focusing grating coupler. The pick-up head of this construction is lighter, smaller, and easier to manufacture than the conventional optical pick-up heads. Like the conventional pick-up head employing the optical lens system, the pick-up head with the optical waveguide also requires that the light beam be directed precisely to a desired track containing a series of pits (tracking control), and that the light beam be focused precisely on the surface of the optical disk (focusing control).

Heretofore, the focusing control has been effected by using a focusing coil or the like to move the optical lens system of the pick-up head along its optical axis, and the tracking control has been effected by using a tracking coil or the like to move the optical lens system in a direction normal to the optical axis. Such tracking and focusing control is also effective in tracking and focusing the pick-up head with the optical waveguide. Use of the above electromagnetic or mechanical means for the tracking and focusing control of the optical waveguide pick-up head is however disadvantageous in that the pick-up head inevitably becomes large in size, partly offsetting the benefit derived from incorporation of the optical waveguide.

SUMMARY OF THE INVENTION

In view of the foregoing problems of the conventional pick-up heads, it is an object of the present invention to provide a pick-up head for use with optical disks which employs an optical waveguide and which is of a small and lightweight structure including mechanisms for effecting tracking and focusing control.

According to the present invention, a pick-up head for use with an optical disk includes an optical waveguide, a light source, a waveguide lens, a focusing grating coupler, and a light detector, and also comprises means for generating on the optical waveguide a surface elastic wave which travels in a direction across the path of parallel-ray wave light for deflecting the wave light, a tracking error detector circuit for detecting the tracking error of light focused on the surface of the optical disk by the focusing grating coupler and for generating a tracking error signal indicative of the detected tracking error, and a control circuit for controlling the generating means to vary the frequency of the surface elastic wave dependent on the tracking error signal in order to eliminate the tracking error.

The means for generating a surface elastic wave may comprise an inter-digital transducer. When the frequency of the surface elastic wave generated by the inter-digital transducer is varied, the angle through which the wave light is deflected by the surface elastic wave is also varied. As the angle of deflection of the wave light is varied, the position where the light is guided by the focusing grating coupler toward the optical disk is changed to vary the spot position of the light on the optical disk. Therefore, tracking control of the pick-up head can be effected by varying the frequency of the surface elastic wave dependent on the tracking error signal to change the spot position of the light on the optical disk. Since the inter-digital transducer may be disposed on the optical waveguide, the overall pick-up head is much smaller than those employing the tracking coil. Focusing control of the pick-up head may be carried out by a known focusing control mechanism.

According to the present invention, the pick-up head may also include a focusing error detector circuit for detecting the focusing error of the light focused on the surface of the optical disk by said focusing grating coupler and for generating a focusing error signal indicative of the detected focusing error, a bimorph for moving the optical waveguide in a direction substantially parallel to a path of the light guided by the focusing grating coupler out of the optical waveguide toward the optical disk, and a bimorph control circuit for applying to the bimorph a voltage dependent on the focusing error signal in order to eliminate the focusing error. With this arrangement, focusing control of the pick-up head is effected by the bimorph.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
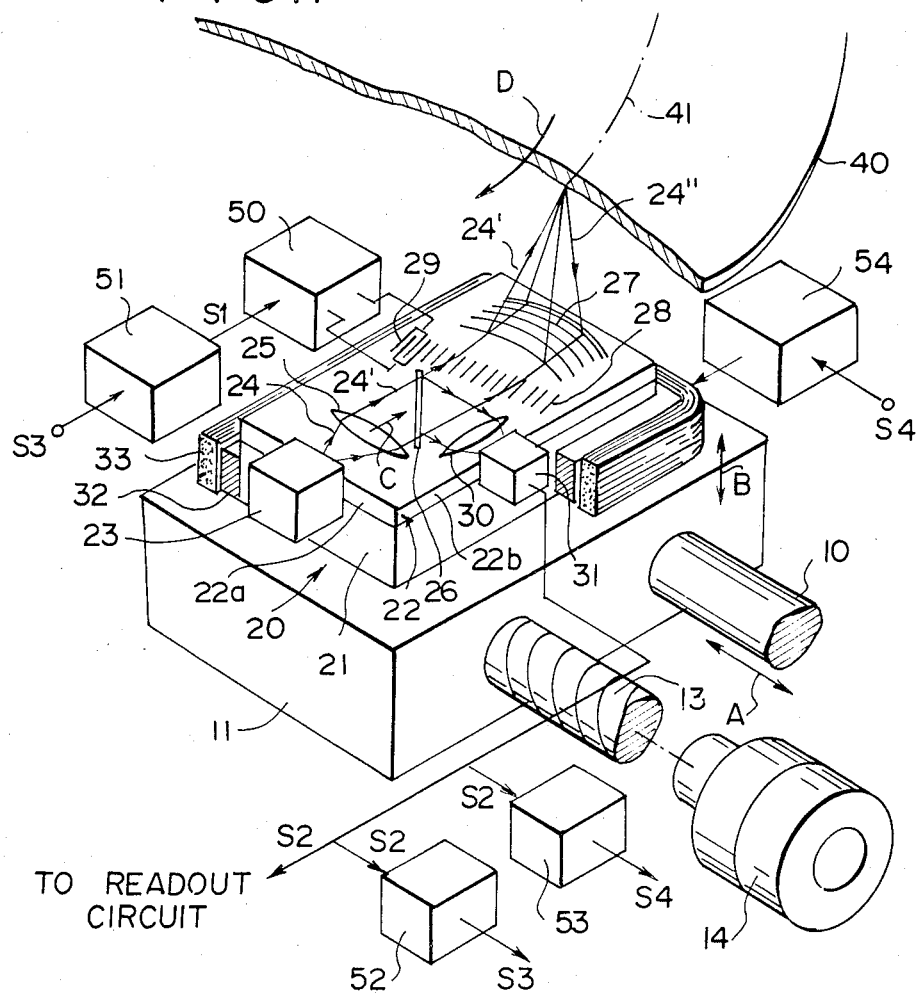
FIG. 1 is a schematic perspective view, partly cut away, of a pick-up head according to a first embodiment of the present invention.

Like or corresponding parts are denoted by like or corresponding reference characters throughout the views.

FIG. 1 shows a pick-up head for reading out signals recorded on an optical disk. The pick-up head has a read head 20 supported on a movable block 11 which is movable in the direction of the arrow A along a guide rod 10. A feed screw rod 13 threadedly extends through the movable block 11 parallel to the guide rod 10, and is connected at one end to a feed motor 14. The movable block 11 can be moved in the direction of the arrow A by energizing the feed motor 14 to rotate the feed screw rod 13 about its own axis.

The read head 20 comprises a substrate 21, an optical waveguide 22 disposed on the substrate 21, a semiconductor laser 23 directly coupled to one end 22a of the optical waveguide 22, a waveguide lens 25 disposed on the optical waveguide 22 at a position toward which a laser beam 24 emitted from the semiconductor laser 23 is directed, a beam splitter 26 disposed on the optical waveguide 22 at a position through which parallel rays of laser light (wave light) 24' from the waveguide lens 25 passes, and a focusing grating coupler (FGC) 27 formed on the surface of the optical waveguide 22 at a position through which the wave light 24' transmitted from the beam splitter 26 passes. An inter-digital transducer (IDT) 29 is disposed on the optical waveguide 22 for generating a surface elastic wave 28 which travels in a direction crossing the path of the wave light 24' between the focusing grating coupler 27 and the beam splitter 26. The read head 20 also includes a waveguide lens 30 for focusing returned light 24" (described in detail below) reflected from the beam splitter 26, and a light detector 31 coupled to a side 22b of the optical waveguide 22 for detecting the focused returned light 24".

As an example, the substrate 21 may be in the form of an $LiNbO_3$ wafer, and the optical waveguide 22 may be formed by depositing a Ti diffused film on the surface of the wafer. The substrate 21 may alternatively be a crystalline substrate of sapphire, Si or the like. The optical waveguide 22 may alternatively be formed by sputtering or evaporating any of various materials other than Ti on the substrate 21. For details of optical waveguides, reference should be made to "Integrated Optics" edited by T. Tamir, Topics in Applied Physics, vol. 7, published by Springer-Verlag in 1975, and also to "Optical Integrated Circuits" written by Nishihara, Haruna, and Saibara, published by Ohm-sha in 1985. Any of these known optical waveguides can be used as the optical waveguide 22 of the present invention. However, the optical waveguide 22 must be made of such a material as a Ti diffused film which can propagate the surface elastic wave 28. The optical waveguide 22 may be of a laminated structure comprising two or more layers.

The waveguide lens 25 may be a proton-exchange waveguide Fresnel lens, for example. The waveguide lens 25 of this type can be formed by depositing an SiNx film on the surface of the optical waveguide 22, coating a positive-type electron-beam resist on the surface of the deposited film, evaporating an Au conductive thin film on the coated resist, drawing a Fresnel lens pattern with an electron beam, ion-etching a resist pattern that is developed after the Au thin film has been peeled off and transferring the etched resist pattern to the SiNx film, and effecting the known proton exchange after the resist has been peeled off. The focusing grating coupler 27 may for example be formed, after the waveguide lens 25 has been formed, by coating a negative-type electron-beam resist on the surface of the SiNx film, evaporating an Au conductive thin film on the resist, drawing a dielectric grating pattern with an electron beam, and thereafter carrying out the aforesaid process from the step of peeling off the Au thin film to the step of peeling off the resist. The interdigital transducer 29 may for example be formed by coating a positive-type electron beam resist on the surface of the optical waveguide 22, evaporating an Au conductive thin film on the resist, drawing an electrode pattern with an electron beam, developing the pattern after the Au thin film has been peeled off, then evaporating Cr and Al thin films, and finally effecting a liftoff within an organic solvent.

Where the substrate 21 and the optical waveguide 22 are made of a piezoelectric material, the inter-digital transducer 29 may be disposed directly within the optical waveguide 22 or on the substrate 21 for generating the surface elastic wave 28. Where the substrate 21 and the optical waveguide 22 are not made of a piezoelectric material, a piezoelectric thin film such as of ZnO may be formed by evaporation or sputtering on a portion of the substrate 21 or the optical waveguide 22, and the interdigital transducer 29 may be disposed on the piezoelectric thin film.

The substrate 21 is movably supported on the movable block 11 for movement in the direction of the arrow B under magnetic forces produced between a magnet 32 fixed to ends of the substrate 21 and a focusing coil 33 fixed to the movable block 11.

The inter-digital transducer 29 generates the surface elastic wave 28 in response to a high-frequency voltage applied thereto by a transducer driver circuit 50 which is supplied with a drive control signal S1 from a transducer control circuit 51. An output signal S2 from the light detector 31 is delivered to a known signal readout circuit (not shown) and is also applied to a tracking error detector circuit 52 and a focusing error detector circuit 53. The tracking error detector circuit 52 and the focusing error detector circuit 53 generate a tracking error signal S3 and a focusing error signal S4, respectively, which are fed to the transducer control circuit 51 and a coil control circuit 54, respectively.

Operation of the pick-up head shown in FIG. 1 will be described below. The semiconductor laser 23 emits a laser beam 24 which is introduced from the entrance end 22a of the optical waveguide 22 into the optical waveguide 22. The emitted laser beam 24 is converted by the waveguide lens 25 into a parallel-ray beam 24' which travels in a wave mode through the optical waveguide 22 in the direction of the arrow C. The wave light 24' passes through the beam splitter 26 toward the area where the focusing grating coupler 27 is positioned. When the semiconductor laser 23 is driven, a high-frequency voltage is simultaneously applied to the inter-digital transducer 29 to enable the same to produce the surface elastic wave 28. Therefore, the wave light 24' travels across the surface elastic wave 28 (which will be described in detail below). The focusing grating coupler 27 is a dielectric grating having curvature and chirp for directly coupling a plane wave in the optical waveguide 22 to a spherical wave having a focal point in a space outside of the optical waveguide 22. Therefore, the wave light 24' is directed by the focusing grating coupler 27 out of the optical waveguide 22 and focused in the space outside of the optical waveguide 22.

An optical disk 40 is positioned such that the focused light 24' is applied to the information storage surface thereof (lower surface in FIG. 1). The optical disk 40 is rotated by rotating means (not shown) about its center in the direction of the arrow D. The information storage surface of the optical disk 40 bears a multiplicity of pits or depressions representative of image signals and-/or audio signals. The reflected light 24" of the focused light 24' from the optical disk 40 is high in level when the light 24" is reflected from a pit-free region, and is low in level when the light 24" is reflected from a pit region. The reflected light 24" (returned light) enters the optical waveguide 22 through the focusing grating coupler 27 and progresses in a wave mode through the optical waveguide 22 in the direction opposite to the direction of travel of the wave light 24'. The returned light 24" is then reflected by the beam splitter 26 to go out of the optical waveguide 22 through the exit side 22b and detected by the light detector 31. The output signal S2 from the light detector 31 varies in level dependent on whether the returned light comes from a pit-free region or a pit region. Consequently, the signals recorded on the optical disk 40 can be read out by applying the output signal S2 to the readout circuit.

The read head 20 is moved in the direction of the arrow A (radially or approximately radially of the optical disk 40) by energizing the feed motor 14 to change the spot position of the wave light 24' on the optical disk 40 in the radial direction thereof for thereby successively reading out the recorded signals or pits. At this time, the wave light 24' is required to be applied precisely to a desired track 41 comprising a series of pits.

Figure 2:
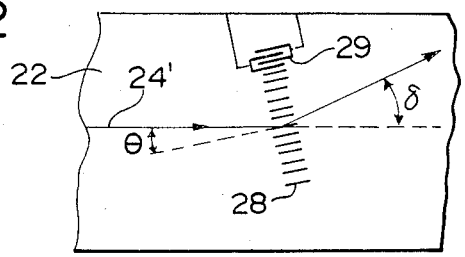
FIG. 2 is a fragmentary plan view showing the manner in which wave light is deflected by a surface elastic wave.

A tracking control process for keeping the spot position of the wave light 24' on the desired track 41 will be described below. The tracking error detector circuit 52 is responsive to the output signal S2 from the light detector 31 for ascertaining whether the spot of the wave light 24' deviates from the track 41 on either side, i.e., whether there is a tracking error or not. If there is any tracking error, the tracking error detector circuit 52 applies a tracking error signal S3 indicative of such a tracking error to the transducer control circuit 51. The tracking error may be detected by any conventional method such as a push-pull method or a heterodyne method, and a suitable circuit arrangement with such an error detecting capability is employed as the light detector 31. The transducer control circuit 51 is responsive to the tracking error signal S3 for controlling the transducer driver circuit 50 to increase or reduce the frequency of the high-frequency voltage applied to the inter-digital transducer 29 according to the tracking error direction indicated by the tracking error signal S3. As described above, the wave light 24' travels across the surface elastic wave 28 and hence is deflected by acoustooptic interaction between the wave light 24' and the surface elastic wave 28. When the frequency of the high-frequency voltage imposed on the inter-digital transducer 29 is varied, the angle through which the wave light 24' is deflected is also varied. More specifically, as illustrated in FIG. 2, assuming that the direction of travel of the surface elastic wave 28 generated by the inter-digital transducer 29 and propagated on the optical waveguide 22 and the direction of travel of the wave light 24' form an angle $\theta$ (Bragg angle), the angle $\delta$ of deflection of the wave light 24' due to the acoustooptic interaction between the wave light 24' and the surface elastic wave 28 is expressed by $\delta = 2\theta$, and the following equation is established:

$$2\theta = 2 \sin^{-1}(\lambda/2Ne \cdot \Lambda)$$
$$\simeq \lambda/Ne \cdot \Lambda$$
$$= \lambda \cdot f/Ne \cdot v$$

where $\lambda$, Ne are the wavelength and effective refractive index, respectively, of the wave light 24', and $\Lambda$, f, v are the wavelength, frequency, and velocity of the surface elastic wave 28. Therefore, $2\theta$ and hence $\delta$ are substantially proportional to the frequency f of the surface elastic wave 28. By varying the frequency of the high-frequency voltage applied to the inter-digital transducer 29 to change the frequency of the surface elastic wave 28, the deflection angle $\delta$ is also varied as a function of the frequency of the high-frequency voltage. As the deflection angle of the wave light 24' is varied, the position where the light 24' is emitted from the focusing grating coupler 27 is changed to vary the spot position of the light 24' on the optical disk 40 in a direction across the track 41. The frequency of the high-frequency voltage is thus controlled to change the deflection angle $\delta$ in order to move the spot position of the light 24' toward the track 41 for thereby eliminating the existing tracking error.

A focusing control process for focusing the light 24' precisely on the surface of the optical disk 40 will now be described below. The focusing error detector circut 53 is responsive to the output signal S2 from the light detector 31 for ascertaining whether the focused position of the light 24' is displaced from the disk surface toward the read head 20 (overfocused) or away from the read head 20 (underfocused), i.e., whether there is a focusing error or not. If there is a focusing error, the focusing error signal S4 indicative of such a focusing error is delivered from the focusing error detector circuit 53 to the coil control circuit 54. The focusing error may be detected by any of conventional detecting methods. In response to the focusing error signal S4, the coil control circuit 54 supplies the focusing coil 33 with a current dependent on the direction of the focusing error, i.e., either toward or away from the read head 20, represented by the focusing error signal S4 to move the read head 20 in a direction to eliminate the focusing error. Therefore, the light 24' always remains focused precisely on the surface of the optical disk 40. The focusing coil 33 and the coil control circuit 54 are essentially the same as those in any prior focusing control system for moving a focusing lens along its optical axis.

Figure 3:
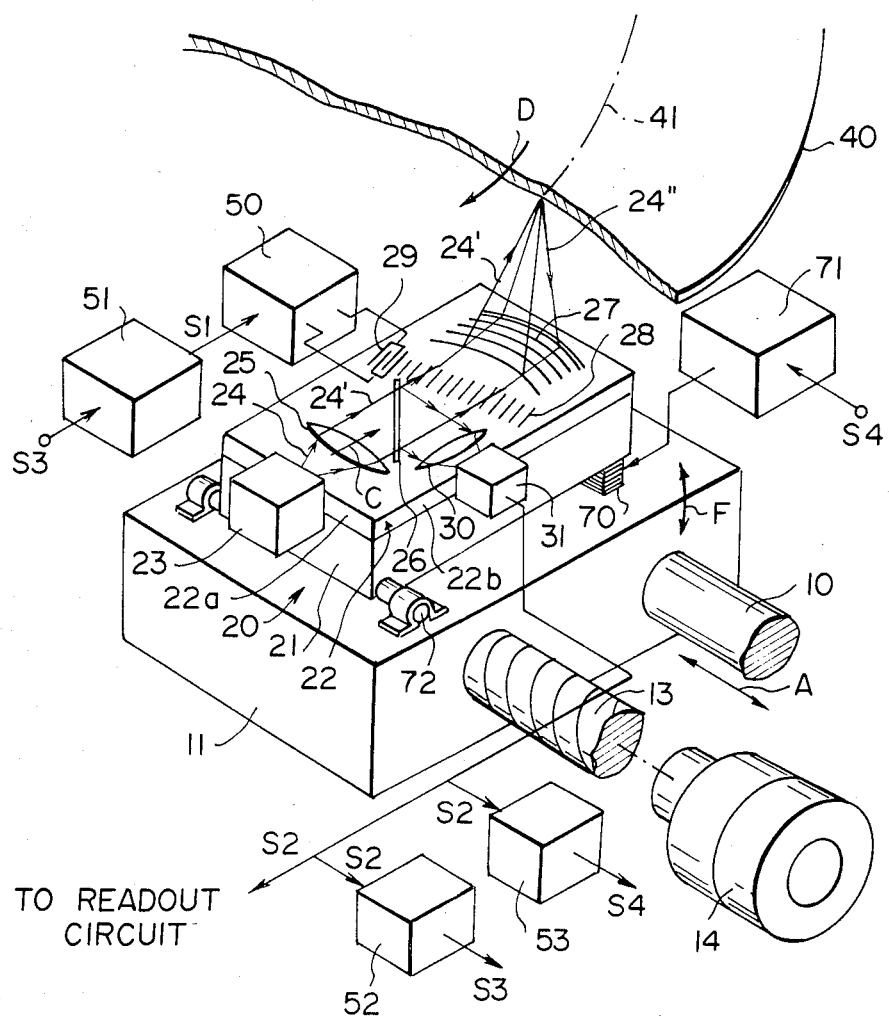
FIG. 3 is a schematic perspective view, partly cut away, of a pick-up head according to a second embodiment of the present invention.

FIG. 3 shows a pick-up head according to a second embodiment of the present invention. The pick-up head shown in FIG. 3 differs from the pick-up head of FIG. 1 in that the magnet 32, the focusing coil 33, and the coil control circuit 54 are dispensed with, a bimorph 70 and a bimorph control circuit 71 are added, and the read head 20 is angularly movably supported on the movable block 11 by a pivot shaft 72 at one end of the substrate 21 so that the read head 20 is angularly movable about the pivot shaft 72 in the direction of the arrow F. The other structural details are the same as those of the preceding embodiment of FIG. 1. The bimorph 70 is interposed between the read head 20 and the movable block 11 at the opposite end of the substrate 21, and is driven by the bimorph control circuit 71 to change its height (the length in the vertical direction in FIG. 3) as a function of the magnitude of a voltage applied by the bimorph control circuit 71 to the bimorph 70.

Signals recorded on the optical disk 40 are read out and the tracking control is effected in the same manner as described for the read head shown in FIG. 1. However, the focusing control of the read head of FIG. 3 is effected as follows: The focusing error signal S4 from the focusing error detector circuit 53 is applied to the bimorph control circuit 71, which increases or reduces the voltage applied to the bimorph 70 dependent on the direction of the focusing error indicated by the focusing error signal S4. For example, it is assumed that the bimorph 70 is vertically expanded as the applied voltage is increased. When the focused position of the light 24' is displaced from the surface of the optical disk 40 toward the read head 20, i.e., when the light 24' is overfocused, the applied voltage is increased. Conversely, when the focused position of the light 24' is displaced from the surface of the optical disk 40 away from the read head 20, i.e., when the light 24' is underfocused, the applied voltage is lowered. By thus controlling the voltage applied to the bimorph 70 to change its height, the read head 20 is angularly moved about the pivot shaft 72 in the direction of the arrow F in order to eliminate the existing focusing error. As a result, the light 24' is focused precisely on the surface of the optical disk 40.

In each of the embodiments shown in FIGS. 1 and 3, use of the inter-digital transducer 29 which is extremely simple in construction for tracking control of the read head 20 is highly advantageous in that the read head 20 is rendered small and lightweight, resulting in a small and lightweight readout system for use with optical disks. The read head 20 shown in FIG. 2 is much smaller and lighter since focusing control is carried out by the bimorph of simple structure.

Inasmuch as the tracking control process is carried out by the inter-digital transducer for deflecting the wave light without involving movement of any heavy optical lens system, the tracking control response of the read head is increased.

Although certain preferred embodiments have been shown and described, it should be understood that many changes and modifications may be made therein without departing from the scope of the appended claims.

What is claimed is:

1. A pick-up head and tracking control for use with an optical disk, comprising in combination:
   (i) an optical waveguide made of a material capable of a propagating a surface elastic wave;
   (ii) a light source for emitting light into said optical waveguide;
   (iii) a waveguide lens for converting wave light traveling through said optical waveguide into parallel-ray wave light;
   (iv) a focusing grating coupler formed on a surface of said optical waveguide for guiding the wave light out of the surface of said optical waveguide and for focusing the wave light onto a surface of the optical disk;
   (v) a light detector for detecting light which has been reflected by the surface of the optical disk back into said optical waveguide through said focusing grating coupler;
   (vi) means for generating on said optical waveguide a surface elastic wave which travels in a direction across a path of said parallel-ray wave light for deflecting the wave light;
   (vii) a tracking error detector circuit for detecting a tracking error of light focused on the surface of the optical disk relative to a track on the optical disk by said focusing grating coupler and for generating a tracking error signal indicative of the detected tracking error; and
   (viii) a control circuit for controlling said generating means to vary a frequency of said surface elastic wave dependent on said tracking error signal in order to eliminate said tracking error by deflection of the wave light in a direction across the track.

2. A pick-up head according to claim 1, further including:
   (i) a focusing error detector circuit for detecting a focusing error of the light focused on the surface of the optical disk by said focusing grating coupler and for generating a focusing error signal indicative of the detected focusing error;
   (ii) a bimorph for moving said optical waveguide in a direction substantially parallel to a path of the light guided by said focusing grating coupler out of said optical waveguide toward the optical disk; and
   (iii) a bimorph control circuit for applying to said bimorph a voltage dependent on said focusing error signal in order to eliminate said focusing error.

3. A pick-up head according to claim 2, further including a substrate supporting said optical waveguide thereon and a movable block movable substantially radially of the optical disk, said bimorph being interposed between said substrate and said movable block.

4. A pick-up head according to claim 3, wherein said substrate is angularly movably mounted at one end thereof on said movable block, said bimorph being positioned at an opposite end of said substrate.

* * * * *